United States Patent [19]

Burrows et al.

[11] 4,016,295
[45] Apr. 5, 1977

[54] PROTEINACEOUS FOOD PRODUCT

[75] Inventors: Ian Edward Burrows, Gaddesby; Peter Arthur Cheney, Mountsorrell, England

[73] Assignee: Pedigree Petfoods Limited, Melton Mowbray, England

[22] Filed: Oct. 17, 1974

[21] Appl. No.: 515,674

[30] Foreign Application Priority Data

Oct. 18, 1973 United Kingdom ............ 48665/73

[52] U.S. Cl. .................................. 426/43; 426/7; 426/56; 426/92; 426/580; 426/643; 426/646; 426/656; 426/805

[51] Int. Cl.$^2$ ..................................... A23B 4/12

[58] Field of Search ............. 426/7, 55, 56, 59, 92, 426/350, 356, 364, 580, 641, 658, 805, 656, 646, 43

[56] References Cited

UNITED STATES PATENTS

| | | | |
|---|---|---|---|
| 2,560,621 | 7/1951 | Wrenshall | 426/356 X |
| 2,986,469 | 5/1961 | Kruss | 426/56 |
| 3,041,174 | 6/1962 | Ehlert | 426/59 |
| 3,502,481 | 3/1970 | Schaap et al. | 426/356 X |
| 3,873,736 | 3/1975 | Palmer et al. | 426/92 |

*Primary Examiner*—Raymond N. Jones
*Assistant Examiner*—C. A. Fan
*Attorney, Agent, or Firm*—Davis, Hoxie, Faithfull & Hapgood

[57] ABSTRACT

A novel, protein-rich food product, especially suitable for domestic animals, is made by subjecting protein material such as meats or fish to acid-producing fermentation, and preferably also to autolysis or proteolysis, and adding the acidic fermented material to a colloidal solution of protein, such as milk or soya milk, whereupon the diposed protein is precipitated and forms a curd that entraps and binds the particles of fermented material. The curd and entrapped material are separated off and compacted into a coherent mass. The product, which is a compacted mass of the precipitated protein with particles of the fermented material distributed through it, can have the consistency of a cheese and may be formed into "cheese" shapes. The flavor of the product is influenced by the nature of the fermented material.

8 Claims, No Drawings

PROTEINACEOUS FOOD PRODUCT

The present invention relates to the preparation of a proteinaceous food product.

In the traditional production of cheese, rennet is added to milk to destroy the colloid stabilizing property of the casein by enzymatic action, whereupon the curd separates and is collected and compacted. Cottage cheese, however, is obtained as a result of the lactic fermentation of milk, the colloidal suspension breaking down, with separation of curd, under the action of acid produced in the milk.

The proteinaceous food product produced in accordance with this invention comprises a compacted mass of acid-precipitated protein or curd fortified with particles of other proteinaceous material distributed and embedded in the mass. Where the other proteinaceous material has a distinct flavour or aroma, the product of this invention may be flavoured or aromatized accordingly. The product of this invention is a novel food product of high-protein content. It may have a consistency similar to that of cheese and, if desired, may be formed into conventional "cheese" shapes. It is of especial interest in feeding domestic animals.

In accordance with this invention, a fermentable proteinaceous material is subjected to acid-producing fermentation, the fermented material is added to a colloidal solution of a binder protein such that the binder protein is precipitated by the acid in the form of a curd that entraps and binds the fermented material, and the curd and entrapped material are separated off and pressed into a compact mass. The proteinaceous material is preferably also subjected to autolysis or to proteolysis by added proteolytic enzymes or micro-organisms whereby the fermented material has a liquid or semi-liquid consistency when it is added to the colloidal solution of the binder protein. Proteolytic enzymes can be obtained from animal, plant or vegetable sources. Mixtures of enzymes can also be used.

In the preferred process, autolysis should accompany fermentation but, where proteolysis is conducted through the use of proteolytic enzymes from an exogenous source, other conditions may apply. Thus, in the case of alkaline or neutral proteases the preferred system allows proteolysis to proceed for up to four hours prior to initiating fermentation. When raw meats, fish or other protein material are used then obviously the autolytic enzymes would contribute some activity during this period. Acid proteases will normally work during the fermentation as for optimum activity they depend upon the lower pH which develops during fermentation. In certain cases it may be desirable to heat sterilize the materials before fermentation. In such circumstances, autolysis would be unable to proceed due to denaturation of the enzyme systems and exogenous enzymes must be added if proteolysis is to be brought about.

The preferred binder protein is milk protein, and the formation of the curd can be brought about simply by adding the acid fermented material directly to milk or an aqueous dispersion of milk powder. Other binder proteins, either animal or vegetable in origin, that can conveniently be prepared in colloidal solution and precipitated by acid may, however, be used. Examples of alternative binder protein solutions include blood and the extract of soy bean known as "soya milk". The proteinaceous material to be fermented is preferably animal tissue protein, for example meat, fish or offal, or a mixture of materials. It may be raw, chilled or frozen.

The product may also contain colouring matters, added vitamins, mineral supplements, anti-oxidants and binding systems such as gellable hydrophilic colloids or coagulable proteins, to confer stiffness or gel properties. It may also contain an anti-mycotic such as a sorbic acid compound, for example potassium sorbate. Since certain micro-organisms can metabolize sorbate, it may be necessary to adjust the concentration of sorbate in the fermenting material to ensure that the desired final level of sorbate is achieved in the product.

The preferred analysis of the product by weight is: 15-50% and more especially about 30% protein, 3-40% and especially about 15% carbohydrate, 2-12% and especially about 5% fat and 25-60% and especially about 50% moisture. The product preferably contains 0.2-0.8%, especially about 0.5% antimycotic and may have an ash analysis of 1.0-2.2%. A typical analysis of a preferred product according to the invention is: moisture — 50%; protein — 29%; fat — 4.75%; ash — 1.80%; carbohydrate — 14.0%; potassium sorbate — 0.45%.

The fermentation by acid-producing micro-organisms is preferably continued until the pH of the material is lowered to within the range 3.6-4.5, especially such that the final product has a pH in the approximate range 4.0-6.0.

In the preferred method of this invention the proteinaceous starting materials are comminuted, usually by mincing through a 1.0-2.0 cm plate. Other methods of comminution, e.g. chopping or cubing, can be used. Desirable fermentation additives such as fermentable carbohydrate and organic acid may be added, and antimycotic may also be added at this stage. For example, 10% of a fermentable carbohydrate such as glucose, 0.5% of potassium sorbate and 0.2% citric acid based upon the weight of proteinaceous starting materials may be added and mixed in well. The mixture is inoculated with a starter culture of lactic acid producing bacteria, e.g. L casei or S. lactis, and the mixture incubated at 30° C. until the pH of the system reaches 4.0. The temperature may be varied depending upon the strain or species of microorganism used.

As previously stated, in the case of raw undenatured proteinaceous starting materials, autolysis may be allowed to proceed during fermentation. When protease enzymes of exogenous origin are used they should be added directly after comminution. The enzyme or mixture of enzymes and the proteinaceous materials are then incubated for the optimum period of time, i.e. one to two hours at the optimum temperature for enzyme activity. When proteolysis has proceeded to a sufficient degree the carbohydrate, potassium sorbate and citric acid may be mixed in. The mixture is cooled to 30° C and inoculated with viable lactic acid producing bacteria. Further incubation then takes place and the mixture allowed to ferment until the pH of the slurry falls to about 4.0. After incubation, the material is added slowly with agitation to a colloidal solution of milk solids, for example pasteurized milk or a solution of spray dried skim milk.

After complete addition of the fermented material the curd is allowed to separate and the whey and residual liquor from the proteinaceous material ferment is removed. The curd is then pressed and drained and can then be stored in a conventional manner.

The following are examples of the practice of this invention:

EXAMPLE 1

A fermented autolysed spray slurry was prepared by first comminuting 1,000 parts by weight of raw deep frozen sprats by passage through a mincer fitted with a 1.0 cm plate. 100 parts by weight of lactose, 6 parts by weight of potassium sorbate and 0.2 parts by weight of citric acid were added and mixed well in. 110 parts by weight of a 24 log hour old culture of *Lactobacillus Lactis* were added and mixed well in. The whole mixture was incubated at 37° C until the pH of the mixture reached 4.0. During this time autolysis took place and a fluid slurry was produced.

Thirty parts by weight of this fermented and autolysed sprat slurry were added slowly with stirring to 70 parts by weight of 20% spray-dried skim milk solution held at 45° C. During the course of the addition the pH of the milk was reduced by the lactic acid in the fermented fish and as the milk proteins precipitated a curd was formed which contained the solid components and some of the liquors of the added fish. The fish contained 0.5% potassium sorbate, but if necessary the concentration should be adjusted prior to addition of the acidified or low pH component. Gentle mixing by a slowly revolving magnetic follower was provided during the addition to ensure adequate mixing of the components without homogenization of the curd. The mixture was allowed to cool to ambient temperature and the liquors drained from the curd by decantation. The very moist and soft curd was then subjected to slow vacuum filtration until as much water and liquors as possible had been removed in this way.

The curd was then removed from the vessel, and packaged or wrapped in a conventional way prior to storing at subambient temperature.

The product had a texture similar to Cheddar cheese, a pH of 4.5–5.0 and a pleasant fish aroma.

EXAMPLE 2

A fermented fish slurry was prepared as described in Example 1, except that *L. casei* was used instead of *L. Lactis*, lactose was used as the carbohydrate and the incubation temperature was 30° C.

A curd was produced as in Example 1 but using 65 parts by weight of milk and 20 parts of the fermented fish. During curd formation 15 parts by weight of meat chunks or meat analogue chunks approximately 1 cm × 1 cm were added and uniformly dispersed within the forming curd.

The curd was separated and treated as described in Example 1.

The texture was similar to that of Cheddar cheese but of attractive appearance due to the lumps of meat or meat analogue visible on slicing the curd with a knife. The pH was about 5.0 and the product had a very pleasant odour.

EXAMPLE 3

A fermented slurry was produced as described in Example 1, except that *L. casei* was used, with "Trudex" as the fermentable carbohydrate and an incubation temperature of 30° C.

Forty parts by weight of the fermented and autolysed sprats, pH 4.0, were added slowly to 60 parts of a 20% solution of spray dried skim milk at 45° C. Gentle agitation of the mixture was provided during the addition.

On complete addition of the fermented fish the formed curd was allowed to separate prior to removal of the whey and fish liquors. The curd was then pressed and allowed to drain for 24 hours before being stored in a conventional manner at 4° C.

The product had a Cheddar cheese like consistency, a pH of 4.5–5.0, and a faintly fishy aroma.

EXAMPLE 4

A fermented autolyzed meat slurry was prepared from equal parts of beef lung, heart, liver and tripe, the materials being fermented as described in Example 2.

10 parts by weight of the autolysed meat slurry were added slowly with gentle agitation to 90 parts by weight of a solution of spray dried skimmed milk powder in water. 4 parts by weight of potassium sorbate were added during mixing. Once the curd had formed the agitation was stopped and the temperature of the mixture raised slowly to 55° C. The whey was allowed to drain away from the curd during the process.

When the bulk of the whey had been removed the curd was broken and transferred to a press and compacted in the usual manner.

The product possessed a desirable Cheddar cheese like texture and the aroma of cooked liver. It had a pH of 4.2 and was highly acceptable to pet animals. Discrete chunks of the less autolytic meats were visible throughout the product.

EXAMPLE 5

A fermented tripe slurry was prepared using the procedure described in Example 2 except that the initially frozen tripe was thawed prior to comminution in a bowl chopper. After fermentation discrete pieces of tripe were obvious in the slurry.

20 parts by weight of the fermented tripe were added slowly with agitation to 80 parts by weight of a 20% solution of spray dried skimmed milk powder containing 4 parts by weight of potassium sorbate. On precipitation of the curd, the same procedure was followed as described in Example 4 above.

EXAMPLE 6

"Soya milk" was prepared by a conventional method, as follows.

10 parts by weight of soya beans were ground and added to 100 parts by weight of water. The pH was raised to 9.0 and the mixture homogenized and held for one hour. The solution was then clarified by passage through a centrifuge, the clarified extract being used as soya milk.

The procedure followed to cause precipitation of the protein was exactly the same as that described for ordinary milk, e.g. as described in Example 4.

We claim:

1. A method of making an edible proteinaceous food product comprising the steps of:
   fermenting carbohydrate in the presence of animal-derived proteinaceous material to produce acid;
   adding the fermented material to a colloidal solution of a another protein, the said fermentation having been continued sufficiently to acidify and thereby precipitate said other protein in the form of a curd that entraps and binds the fermented material;
   separating off said curd and entrapped material; and pressing the separated material into a compact mass.

2. A method according to claim 1 including the further step of:

subjecting said proteinaceous material to autolysis or proteolysis together with said fermentation and thereby reducing said fermented material to an at least partially liquid consistency.

3. A method according to claim 1 wherein said fermentation is continued until said fermented material has a pH value of at most about 4.

4. A method according to claim 1 wherein said fermented material is added to a colloidal aqueous solution of milk solids.

5. A proteinaceous food product produced by the process of claim 1.

6. A food product according to claim 5 comprising a proteinaceous curd of acid precipitated milk solids.

7. A food product according to claim 5 comprising by weight from 15 to 50% protein, from 2 to 12% fat, from 3 to 40% carbohydrate and about 25 to 60% moisture.

8. A food product according to claim 5 having a pH value in the approximate range 4.0–6.0.

* * * * *

UNITED STATES PATENT AND TRADEMARK OFFICE
CERTIFICATE OF CORRECTION

PATENT NO. : 4,016,295
DATED : April 5, 1977
INVENTOR(S) : Ian Edward Burrows et al.

It is certified that error appears in the above-identified patent and that said Letters Patent are hereby corrected as shown below:

Column 3, line 5, "spray" should be--sprat--.

Column 3, line 39, "fish" should be--fishy--.

Column 3, line 61, after "fermented" insert--spray--.

Signed and Sealed this

Eleventh Day of April 1978

[SEAL]

Attest:

RUTH C. MASON
Attesting Officer

LUTRELLE F. PARKER
Acting Commissioner of Patents and Trademarks

UNITED STATES PATENT OFFICE
CERTIFICATE OF CORRECTION

PATENT NO. : 4,016,295
DATED : April 5, 1977
INVENTOR(S) : Ian Edward Burrows et al.

It is certified that error appears in the above—identified patent and that said Letters Patent are hereby corrected as shown below:

Change the designation of the assignee appearing on the first page by deleting "Pedigree Petfoods Limited, Melton Mowbray, England" and substituting the name of the assignee designated as follows:

Assignee: Mars Limited,
                  London, England

Signed and Sealed this

Seventeenth Day of July 1979

[SEAL]

Attest:

LUTRELLE F. PARKER
*Attesting Officer*     *Acting Commissioner of Patents and Trademarks*